US006796919B2

United States Patent
Johnson

(12) United States Patent
(10) Patent No.: US 6,796,919 B2
(45) Date of Patent: Sep. 28, 2004

(54) PULLEY TIRE AND RIM

(75) Inventor: William Johnson, Myaree (AU)

(73) Assignee: JLV Industries PTY Ltd., Myaree (AU)

(*) Notice: Subject to any disclaimer, the term of this patent is extended or adjusted under 35 U.S.C. 154(b) by 0 days.

(21) Appl. No.: 09/881,164

(22) Filed: Jun. 14, 2001

(65) Prior Publication Data

US 2001/0039985 A1 Nov. 15, 2001

(30) Foreign Application Priority Data

Jul. 8, 1999 (AU) .............................................. PQ1508
Jul. 5, 2000 (AU) ............................................. 45049/00

(51) Int. Cl.[7] .............................................. F16H 55/36
(52) U.S. Cl. ...................... 474/182; 474/94; 474/164
(58) Field of Search .......................... 474/94, 166, 168, 474/177, 179, 181, 182, 183, 192; 384/549; 152/396, 397, 398

(56) References Cited

U.S. PATENT DOCUMENTS

| 244,976 A | * | 8/1881 | Bilby, Jr. ..................... 384/127 |
| 905,756 A | * | 12/1908 | Skinner ........................... 16/45 |
| 1,780,627 A | | 11/1930 | Muller |
| 2,137,987 A | * | 11/1938 | Smith ........................... 301/5.7 |
| 3,494,212 A | * | 2/1970 | Thompson .................. 74/230.7 |
| 3,565,490 A | * | 2/1971 | Statz ....................... 301/64.303 |
| 4,434,873 A | | 3/1984 | Ohta et al. |
| 5,019,019 A | | 5/1991 | Jones |
| 5,308,289 A | * | 5/1994 | Funahashi .................... 188/379 |
| 5,368,525 A | * | 11/1994 | Funahashi .................... 474/161 |

FOREIGN PATENT DOCUMENTS

| EP | 0 312 256 | 4/1989 |
| GB | 1 125 738 | 8/1968 |
| GB | 2 036 919 | 7/1980 |

* cited by examiner

Primary Examiner—David A. Bucci
Assistant Examiner—Vicky A. Johnson
(74) Attorney, Agent, or Firm—Merchant & Gould P.C.

(57) ABSTRACT

A pulley tire (10) and rim (12), the rim (12) comprising two rim halves (14, 16) adapted to be mounted to a hub (18) and to clampingly engage the pulley tire (10), the pulley tire (10) having provided thereon one or more upstanding members (46), wherein the rim halves (14, 16) are adapted to receive the upstanding members (46) when engaging the pulley tire (10) so as to minimize relative movement therebetween.

14 Claims, 7 Drawing Sheets

PULLEY TIRE AND RIM

FIELD OF THE INVENTION

The present invention relates to a pulley tyre and rim. More particularly, the pulley tyre and rim of the present invention are of the type having a peripheral recess or groove for receiving a rope or cable.

BACKGROUND ART

One form of prior art pulley is exemplified by the disclosure of GB 1125738 in which a rim is disclosed comprising a pair of opposed rim halves which are fixed to a hub to form the outer half of the pulley. Each rim half has bonded thereto a half tyre section. When the rims are bolted to the hub the half tyre sections form a complete tyre having a peripheral recess for accommodation of a rope or cable which is substantially concentric with the surface of the rim halves and hub. The interface between the two half tyre sections is prone to fracturing due to the lack of continuation of the section and the lack of support provided at the junction therebetween.

A further form of the prior art is the pulley tyre rim configuration disclosed in U.S. Pat. No. 5,019,019. This document discloses a single-piece annular tyre arranged to be held between a pair of rim halves. The tyre having provided therein a peripheral groove to locate a rope or cable during operation. Whilst this arrangement goes some way towards overcoming the abovementioned problem of fracturing of the half tyre sections there are additional problems associated with this arrangement. Significant levels of heat are generated during operation of pulleys of this type and this results in an increased flexibility in the tyre as the tyre is typically formed of an elastomeric material, for example polyurethane. The increased flexibility in the tyre can result in slipping of the tyre with respect to the rim halves thereby increasing wear and reducing the life of the tyre. Further, as the tyre wears there is an increasing tendency for it to lift away from the rim halves, upwardly and inwardly. This phenomenon is heightened when the tyre is worn thin and the rope or cable sits well down, or radially inwardly, in the peripheral recess or groove.

UK Patent Application GB 2036919 discloses a pulley assembly in which a half-tyre or liner has either a flange or a metal ring projecting inwardly therefrom and which is engaged by the bolts fixing the rim halves to the hub. This assembly is said to facilitate repair or replacement of the liner when worn.

U.S. Pat. 4,434,873 discloses an arrangement for the detection of worn linings of the sheaves in an elevator car. The groove forming surfaces of the plates forming the sheaves have provided thereon a plurality of projections extending into the non-metallic layers or tyre located thereon. These projections act to complete a circuit with the cable when the tyre is worn, thereby signaling that the tyre is worn.

Whilst the disclosures of GB 2036919 and U.S. Pat. No. 4,434,873 disclose arrangements in which there may be some restriction of rotational movement of the tyre relative to the rim, neither arrangement will combat the lifting away of the tyre from the rim when worn, enabling the use of softer tyre materials than might otherwise be possible.

The pulley tyre and rim of the present invention has one object thereof to overcome substantially the abovementioned problems associated with the prior art, or to at least provide a useful alternative thereto.

Throughout this specification, unless the context requires otherwise, the word "comprise", or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a pulley tyre and rim, the rim comprising two rim halves adapted to be mounted to a hub and to clampingly engage the pulley tyre, the pulley tyre having provided thereon one or more upstanding members, wherein the rim halves are adapted to receive the upstanding members when engaging the pulley tyre so as to minimise relative movement therebetween.

Preferably, the rim halves have complimentary apertures provided therein to receive therein or therethrough the upstanding members provided on the pulley type. The or each upstanding member is preferably provided on an axial surface of the tyre.

Still, preferably, a plurality of complimentary upstanding members and apertures are spaced substantially equidistant around at least one axial surface of the pulley tyre and rim halves. The plurality of complimentary upstanding members and apertures are preferably provided on both axial surfaces of the pulley tyre and rim halves.

The upstanding members preferably project into the apertures of the rim halves a distance allowing the engagement therebetween to at least substantially resist relative rotational and lifting movement of the pulley tyre with respect to the rim halves. The upstanding members are preferably proportioned to project through the apertures in the rim halves. Still preferably, the upstanding members have an enlarged head provided thereon to accentuate positive engagement therebetween. The or each upstanding member may be positioned substantially adjacent a peripheral edge of the axial face of the pulley tyre.

Weather lips may be provided at axial edges of a peripheral face of the pulley tyre, the lips arranged to cover peripheral edges of axial faces of each rim half.

In accordance with the present invention there is further provided a pulley tyre for use with a pulley tyre rim arranged to clampingly engage same, the pulley tyre being of annular configuration with a pair of axial faces and a peripheral face, the or each axial face of the pulley tyre having provided thereon at least one upstanding member arranged for positive engagement with the pulley tyre rim so as to minimise relative movement therebetween.

Preferably, a plurality of upstanding members are provided spaced substantially equidistant about each axial face of the pulley tyre.

BRIEF DESCRIPTION OF THE DRAWINGS

The pulley tyre and rim of the present invention will now be described, by way of example only, with reference to two embodiments thereof and the accompanying drawings, in which.

BEST MODE(S) FOR CARRYING OUT THE INVENTION

Figure 1:
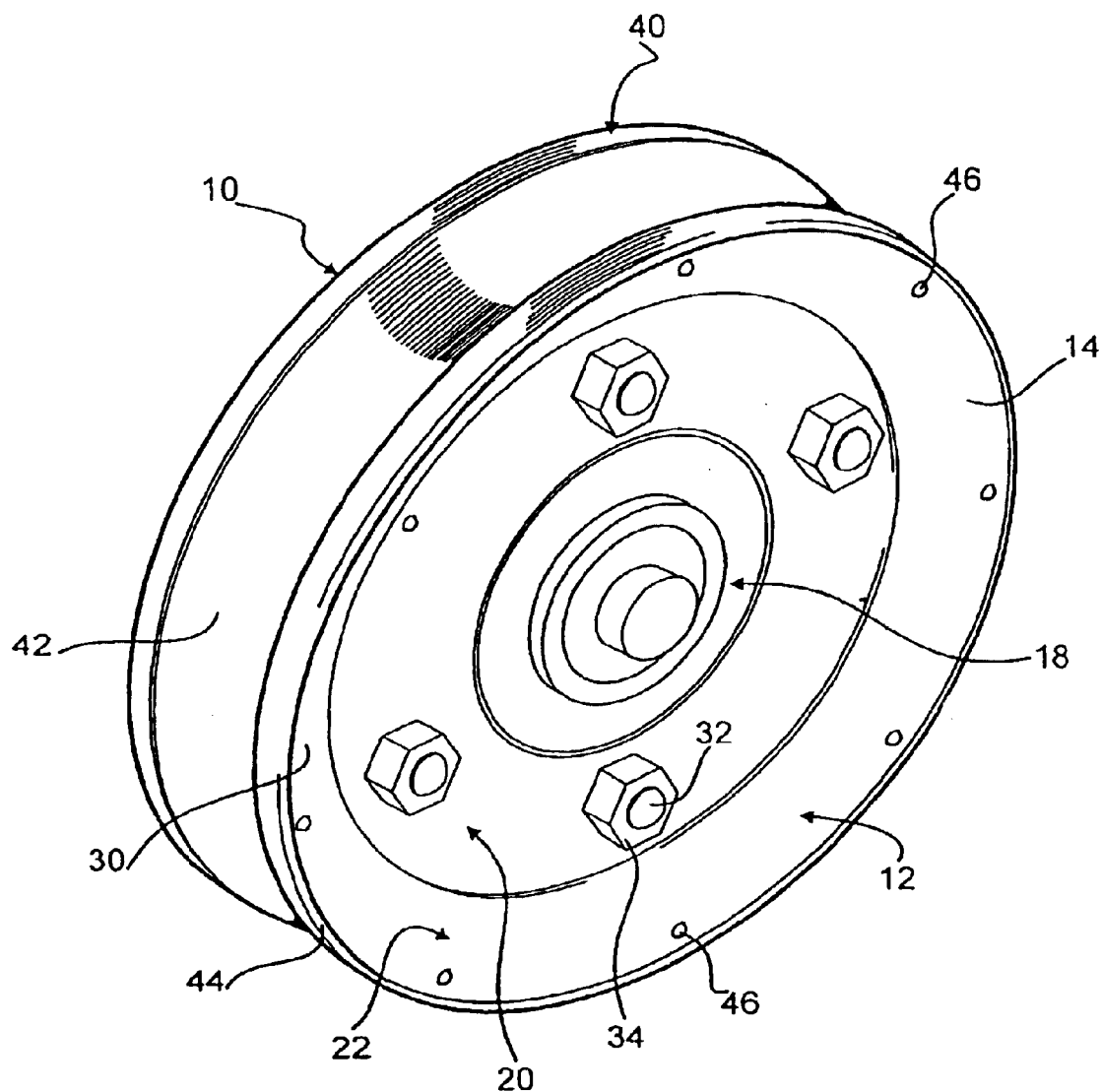
FIG. 1 is a perspective view of a pulley tyre and rim in accordance with a first embodiment of the present invention, the pulley tyre and rim being shown in the assembled configuration.
Figure 2:
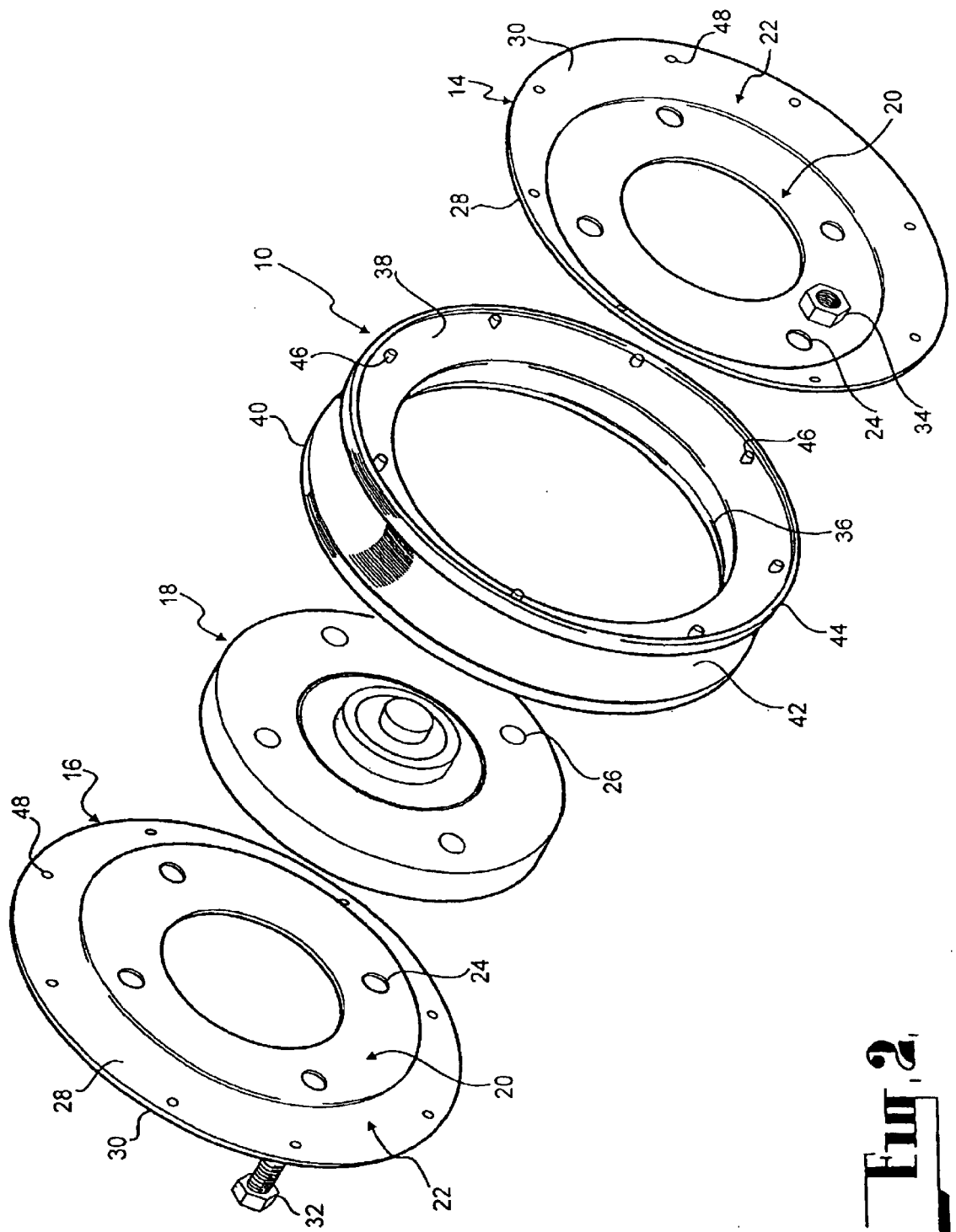
FIG. 2 is an exploded perspective view of the pulley tyre and rim of FIG. 1.
Figure 3:
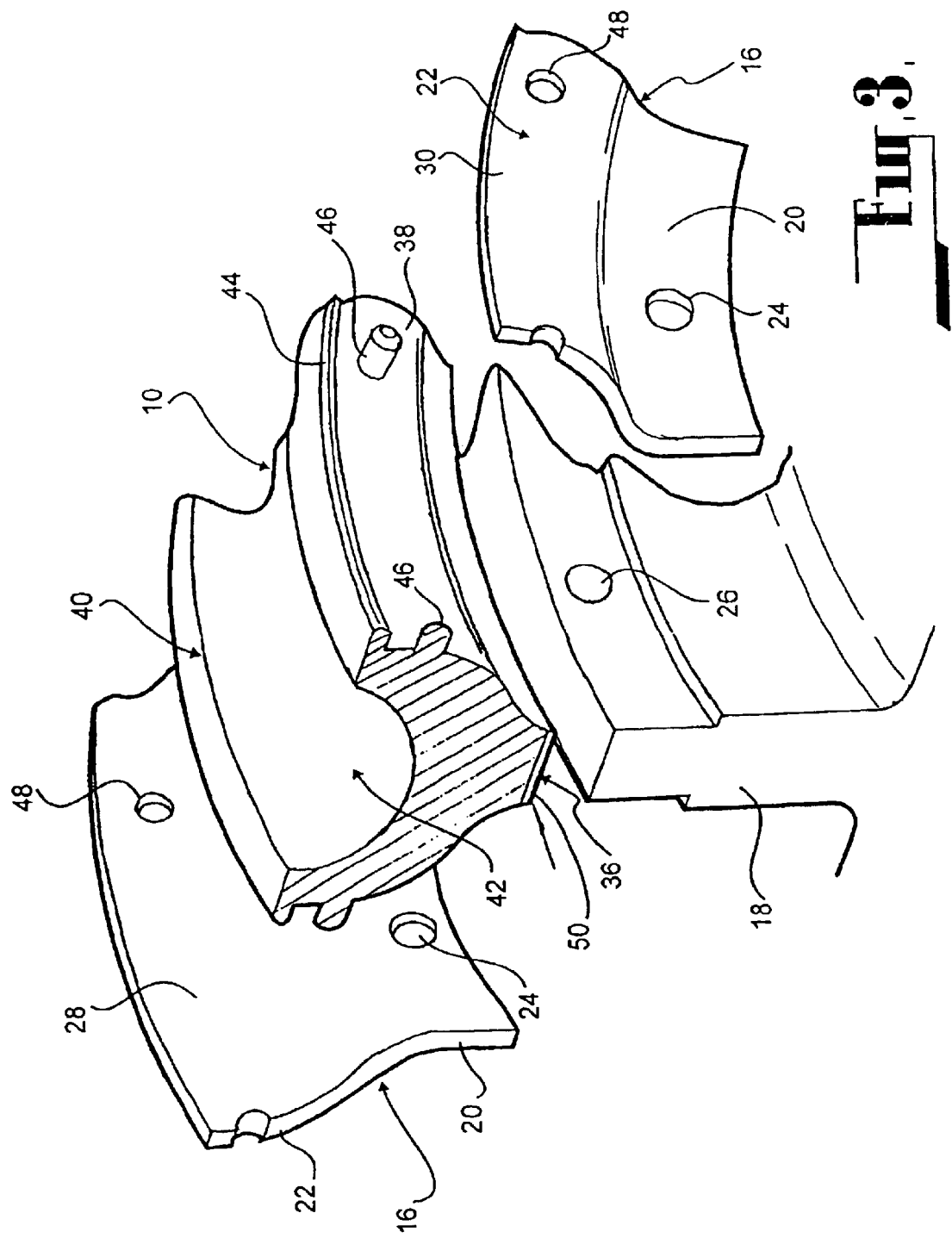
FIG. 3 is an exploded partial view of the pulley tyre and rim of FIG. 1, clearly showing the relationship between the hub, the rim halves and the pulley tyre.
Figure 4:
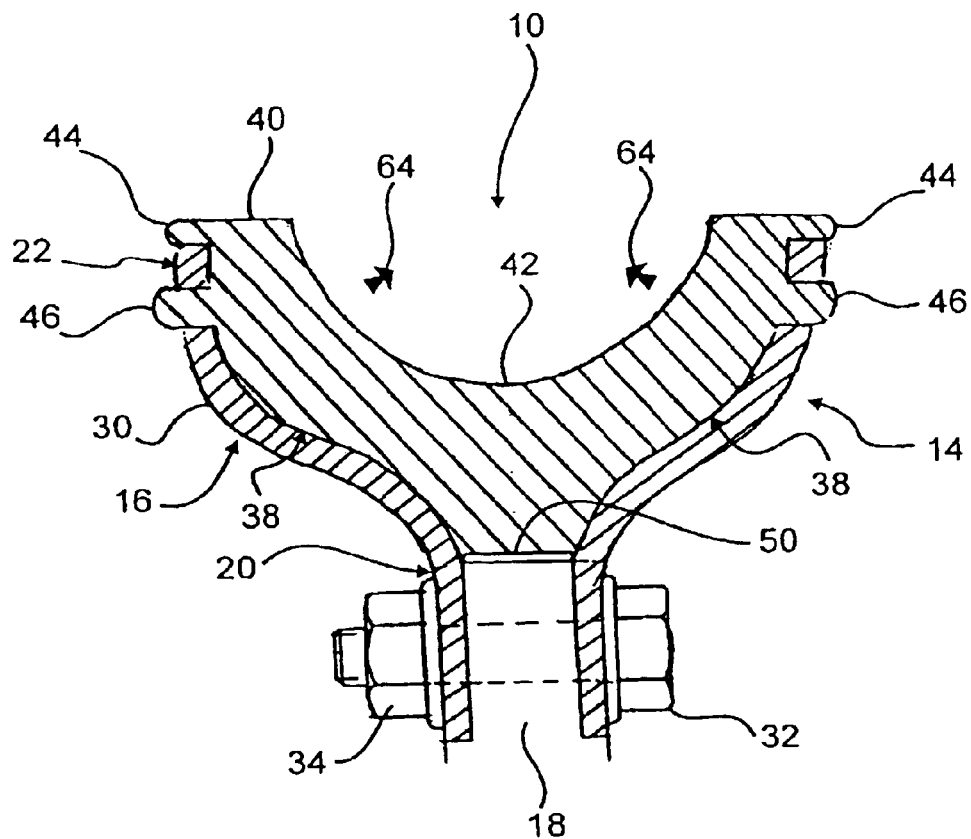
FIG. 4 is a cross-sectional partial end view of the pulley tyre and rim of FIG. 1, showing the relationship between the hub, rim halves and pulley tyre when assembled.
Figure 5:
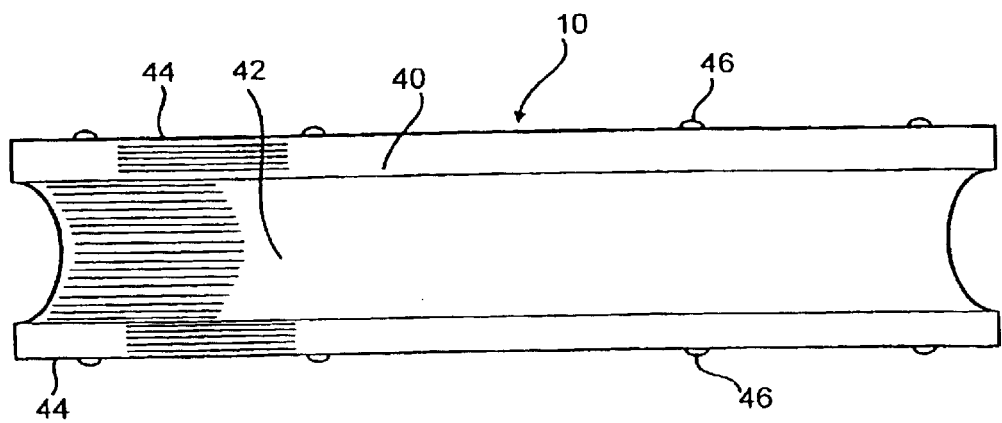
FIG. 5 is a plan view of the peripheral surface of the pulley tyre of FIG. 1.
Figure 6:
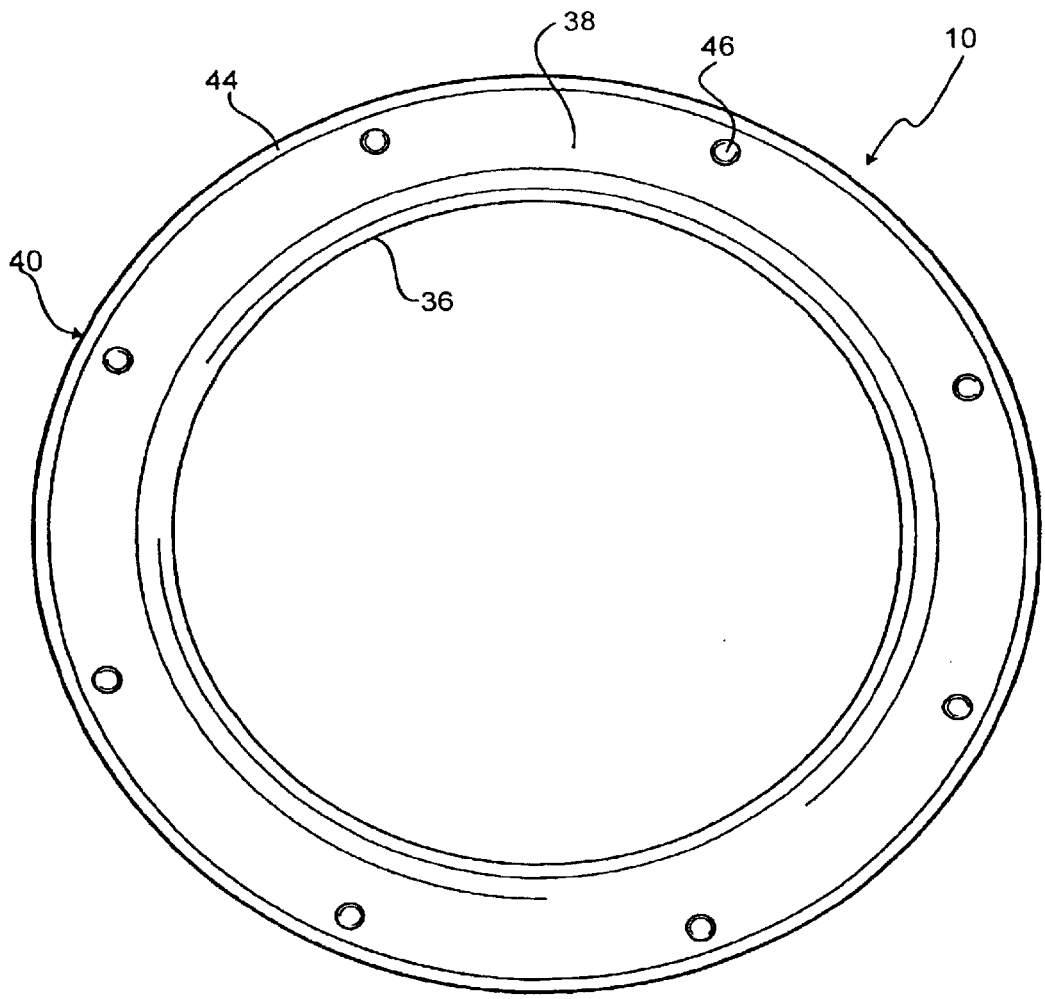
FIG. 6 is a side elevational view of one axial face of the pulley tyre of FIG. 1.

In FIGS. 1 to 6 there is shown a pulley tyre 10 and rim 12, the rim comprising two rim halves 14 and 16. The rim halves 14 and 16 are adapted to be mounted to a hub 18 and to clampingly engage the pulley tyre 10, as is best seen in FIGS. 2 to 4.

The hub 18 is of known type and effectively defines an axis about which the pulley tyre 10 and rim 12 rotate.

Each rim half 14 and 16 comprises an inner portion 20 and an outer portion 22. The inner portion 20 has provided therein a number of apertures 24 arranged to cooperate with apertures 26 provided in the hub 18. The outer section 22 curves outwardly away from a plane defined by the inner section 20 and has provided thereon an inner axial face 28 and an outer axial face 30. The outer portions 22 defined therebetween, in combination with the hub 18 a peripheral space within which the pulley tyre 10 may be located and retained.

Bolts 32 and nuts 34 may be used in known manner to clamp the rim halves 14 and 16 to the hub 18, and in turn to positively locate the pulley tyre 10.

The pulley tyre 10 comprises an inner face 36, a pair of curved axial faces 38 and a peripheral face 40. A peripheral groove 42 is provided substantially centrally in the peripheral face 40. A weather lip 44 is provided at the axial edges of the peripheral face 40 and forms a lip over the peripheral edge of the axial faces 38. The weather lip 44 acts to divert dust and/or water from entering between the pulley tyre 10 and the inner axial faces 28 of the rim halves 14 and 16.

A plurality of upstanding members, for example lugs 46 are provided on both axial faces 38 of the pulley tyre 10. The lugs 46 are located substantially adjacent a peripheral edge of the axial faces 38 and are spaced equidistant thereabout. Both rim halves 14 and 16 have provided in their outer portions 22 a plurality of apertures 48. The apertures 48 are located substantially adjacent a peripheral edge of the outer portions 22 and are spaced equidistant thereabout.

A steel support 50 may be provided bonded to the pulley tyre 10 about the inner face 36 thereof. The support 50 aids in increasing the rigidity of the pulley tyre 10 during operation.

Figure 7:
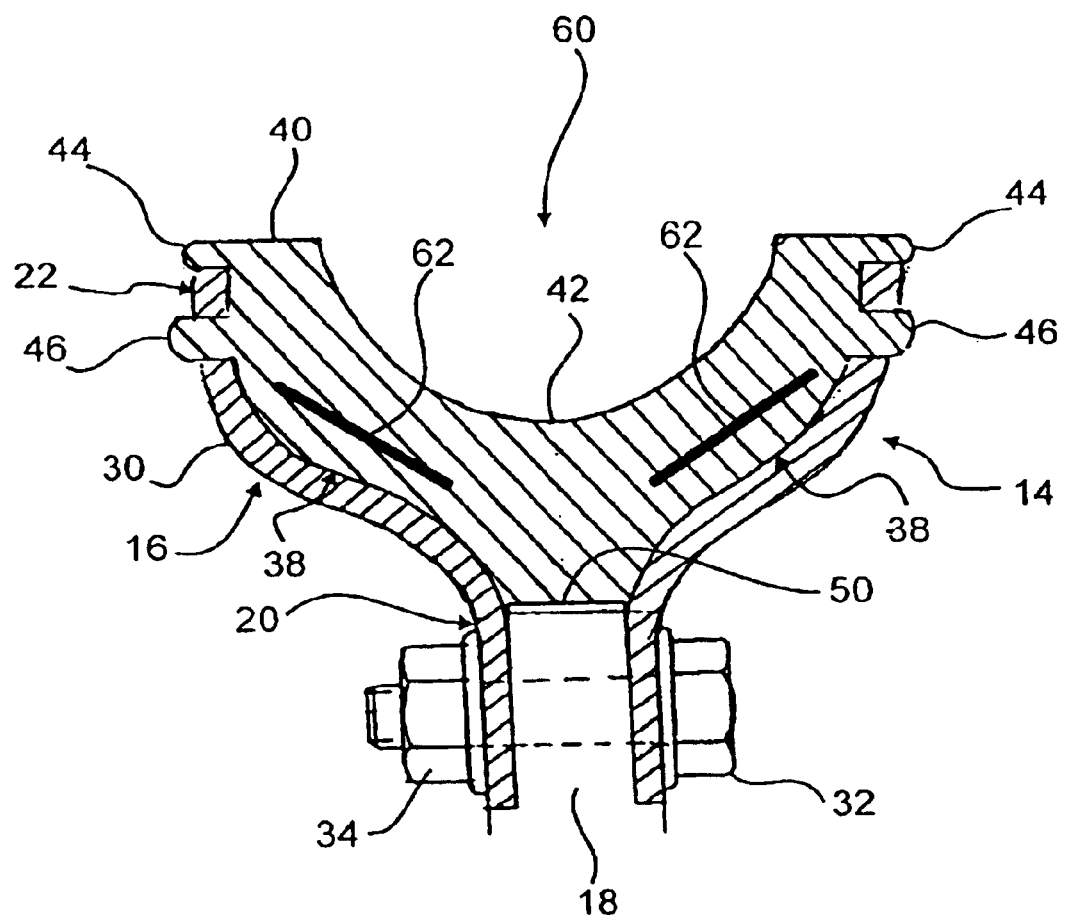
FIG. 7 is a cross-sectional partial end view of a pulley tyre in accordance with a second embodiment of the present invention.

In FIG. 7 there is shown a pulley tyre 60 substantially similar to the pulley tyre 10, like numerals denoting like parts. Additional supports 62 are provided molded within the pulley tyre 60 to further increase the rigidity of the pulley tyre 60 during use. The supports 62 may be formed of steel and it is envisaged that the support 62 may be formed within the pulley tyre 60 during molding thereof.

It is envisaged that the pulley tyres 10 and 60 may be formed of an elastomeric material, for example polyurethane. The lugs 46 and the lip 44 are preferably formed integrally with the remainder of the pulley tyres 10 and 60. Further, the use of polyurethane to form the pulley tyres 10 and 60 leads to a tendency for the pulley tyres 10 and 60 to shrink after manufacture and during use. The presence of the steel support 50 results in the flaring of the tyres 10 and 60 axially as they shrink. This action acts to increase the level of engagement of the tyres 10 and 60 with the rim halves 14 and 16.

On assembling a pulley according to either embodiment of the present invention, the tyre 10 or 60 is snugly fitted over an outer circumference of the hub 18 and the rim halves 14 and 16 are mounted to the hub 18 by utilising the bolts 32 and nuts 34 in known manner. In this manner the rim halves 14 and 16 are brought into clamping engagement with the hub 18. Further, the tyre 10 or 60 is snugly clamped between the rim halves 14 and 16 with the lugs 46 received through the apertures 48 provided therein.

Due to the curved complimentary configuration of the axial faces 38 of the tyres 10 and 60 and the rim halves 14 and 16, any radially inward force applied to the tyres 10 or 60 by a pulley rope or cables serves to bring the tyres 10 or 60 into clamping engagement with the rim halves 14 and 16. The lugs 46 serve to at least substantially prevent slipping of the tyres 10 or 60 with respect to the rim halves 14 and 16 during operation and once the elastomeric material forming the tyres 10 or 60 has been heated and become more flexible. The support 50 and the additional supports 62 each serve to prevent tangential and radial deformation of the pulley tyres and subsequent disengaging of the tyres from the hub 18 and rim halves 14 and 16.

As the pulley tyres 10 and 60 wear during use, as with pulley tyres of the prior art, there is an increased tendency for the axial faces 38 to lift upwardly and inwardly in the direction of arrows 64, as shown in FIG. 4. Such lifting movement is resisted by the location of the lugs 46 within the apertures 48. This arrangement can be seen to provide a pulley tyre 10 or 60 with a longer life span than those of the prior art.

It is envisaged that the supports 50 and 62 may be formed of any suitable reinforcing material such as metal, a fabric web, a metal mesh or alternatively of an elastomeric material similar to that of the remainder of the pulley tyre 10 or 60 but of a greater strength or hardness.

It is further envisaged that the lugs 46 may be provided with enlarged heads that resist removal from the apertures 48. This arrangement acts to accentuate positive engagement between the tyres 10 or 60, and the rim halves 14 and 16.

Figure 8:
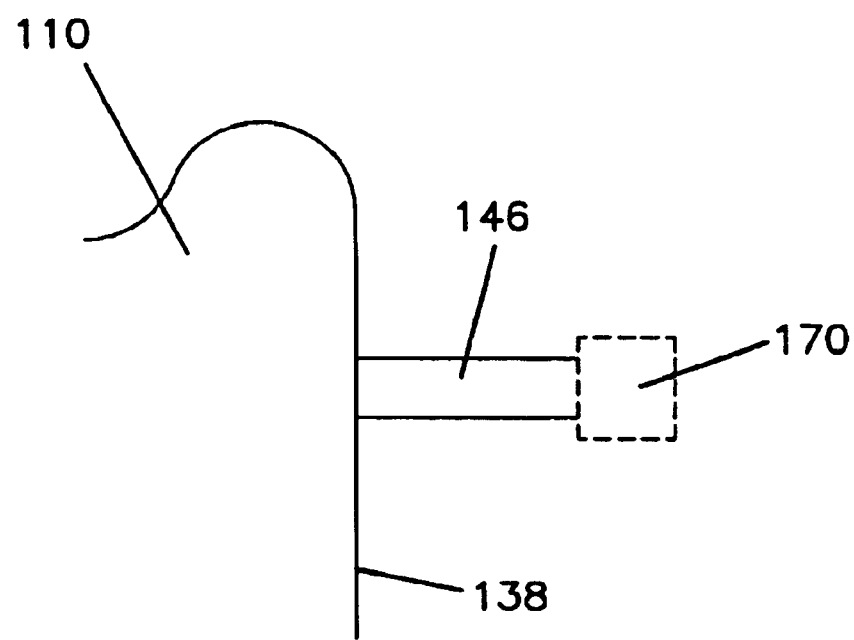
FIG. 8 is a schematic cross-sectional view of a portion of a tyre with a lug having an enlarged head.

One example of a lug 146 having an enlarged head 170 is schematically shown in FIG. 8. Lug 146 protrudes from an axial face 138 of at tyre 110.

Modifications and variations such as would be apparent to the skilled addressee are considered to fall within the scope of the present invention.

What is claimed is:

1. A pulley tyre and rim, the rim comprising two rim halves adapted to be mounted to a hub and to clampingly engage the pulley tyre, the pulley tyre having an exterior face and one or more upstanding members protruding from the exterior face, wherein the rim halves are adapted to receive the upstanding members when engaging the pulley tyre so as to minimise relative movement therebetween.

2. A pulley tyre and rim according to claim 1, wherein the rim halves have complimentary apertures provided therein to receive the upstanding members provided on the pulley tyre.

3. A pulley tyre and rim according to claim 2, wherein each upstanding member is provided on an axial surface of the tyre.

4. A pulley tyre and rim according to claims 2, wherein a plurality of complimentary upstanding members and apertures are spaced substantially equidistant around at least one axial surface of the pulley tyre and rim halves.

5. A pulley tyre and rim according to claim 4, wherein the plurality of complimentary upstanding members and apertures are provided on both axial surfaces of the pulley tyre and rim halves.

6. A pulley tyre and rim according to claim 2, wherein the upstanding members project into the apertures of the rim halves a distance allowing the engagement therebetween to at least substantially resist relative rotational and lifting movement of the pulley tyre with respect to the rim halves.

7. A pulley tyre and rim according to claim 2, wherein the upstanding members are proportioned to project through the apertures in the rim halves.

8. A pulley tyre and rim according to claim 7, wherein the upstanding members have an enlarged head provided thereon to accentuate positive engagement therebetween.

9. A pulley tyre and rim accordingly to claim 1, wherein the or each upstanding member is positioned substantially adjacent a peripheral edge of the axial face of the pulley tyre.

10. A pulley tyre and rim according to claim 1 wherein weather lips are provided at axial edges of a peripheral face of the pulley tyre, the lips arranged to cover peripheral edges of axial faces of each rim half.

11. A pulley tyre and rim according to claim 1, wherein the exterior face is a curved axial surface of the tyre.

12. A pulley tyre for use with a pulley tyre rim arranged to clampingly engage the pulley tyre, the pulley tyre being of annular configuration with a pair of axial faces and a peripheral face, each axial face of the pulley tyre having provided thereon at least one upstanding member protruding therefrom and arranged for positive engagement with the pulley tyre rim so as to minimize relative movement therebetween.

13. A pulley tyre according to claim 12, wherein a plurality of upstanding members are provided spaced substantially equidistant about each axial face of the pulley tyre.

14. A pulley tyre according to claim 12, wherein weather lips are provided projecting axially over the axial faces of the pulley tyre.

* * * * *